(12) United States Patent
Abuelsaad et al.

(10) Patent No.: US 9,246,920 B2
(45) Date of Patent: Jan. 26, 2016

(54) CLOUD RESOURCE CLONING BASED ON COLLABORATIVE CONTENT

(71) Applicant: GLOBALFOUNDRIES Inc., Grand Cayman (KY)

(72) Inventors: Kelly Abuelsaad, Poughkeepsie, NY (US); Lisa Seacat DeLuca, San Francisco, CA (US); Soobaek Jang, Hamden, CT (US); Daniel C. Krook, Fairfield, CT (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 190 days.

(21) Appl. No.: 14/049,553

(22) Filed: Oct. 9, 2013

(65) Prior Publication Data

US 2015/0101017 A1    Apr. 9, 2015

(51) Int. Cl.
*H04L 29/06* (2006.01)
*H04L 12/24* (2006.01)

(52) U.S. Cl.
CPC ............ *H04L 63/10* (2013.01); *H04L 41/5061* (2013.01)

(58) Field of Classification Search
CPC ........................... G06F 21/604; G06F 21/6218
USPC ........................ 726/2–4, 9; 709/224
See application file for complete search history.

(56) References Cited

U.S. PATENT DOCUMENTS

| 8,196,175 | B2* | 6/2012 | Reed et al. ................. 726/1 |
| 8,341,269 | B2 | 12/2012 | Balani et al. |
| 8,881,244 | B2 | 11/2014 | Bhogal et al. |
| 2008/0033957 | A1 | 2/2008 | Forstall et al. |
| 2011/0125894 | A1* | 5/2011 | Anderson et al. ............. 709/224 |
| 2011/0191485 | A1* | 8/2011 | Umbehocker ................. 709/229 |
| 2015/0074743 | A1* | 3/2015 | Ilieva et al. ................... 726/1 |
| 2015/0095979 | A1* | 4/2015 | Windust ........................ 726/3 |

OTHER PUBLICATIONS

Maitland, J., "Keeping Control Isn't Easy", Chapter 4: Cloud-Based Infrastructure, Search-CloudComputing.com, 13 pages, 2011.
Mell, P. et al., "The NIST Definition of Cloud Computing", National Institute of Standards and Technology, Information Technology Laboratory, Vers. 15, Oct. 7, 2009, 2 pages.
Feinberg, J., "CatTail", IBM Watson Research Center, 1 page, no publication date cited, printed Oct. 8, 2013.

(Continued)

*Primary Examiner* — Izunna Okeke
*Assistant Examiner* — Hee Song
(74) *Attorney, Agent, or Firm* — Heslin Rothenberg Farley & Mesiti P.C.

(57) ABSTRACT

An approach for facilitating collaborative support to a user in a networked computing environment (e.g., a cloud computing environment) is provided. In one aspect, specifications that describe a networked resource (e.g., a cloud resource) are retrieved. A set of preferences that specify a set of collaborators and a set of access limitations for the set of collaborators with respect to the networked resource are gathered in response to a request for help by a user. Also in response to the request, a clone of the networked resource is created. A collaborator from the set of collaborators is granted access to clone the networked resource having the set of access limitations. The collaborator can access the clone of the networked resource (e.g., to provide support to the user) until a terminating condition is met, at which time the collaborators' access to the clone is terminated.

17 Claims, 8 Drawing Sheets

(56) References Cited

OTHER PUBLICATIONS

Tschabitscher, H., "How to Link Google Files With Google Calendar Events Easily", About.com, 1 page, no publication date cited, printed Oct. 8, 2013.

Wikipedia, "Google Docs, Sheets, and Slides", http://en.wikipedia.org/wiki/Google_Docs,_Sheets,_and_Slides, Printed May 22, 2015, 28 pages.

Maitland, J., "Keeping Control Isn't Easy", Chapter 4: Cloud-Based Infrastructure, SearchCloudComputing.com, Publication Date: Oct. 2009, 17 pages.

* cited by examiner

CLOUD RESOURCE CLONING BASED ON COLLABORATIVE CONTENT

TECHNICAL FIELD

In general, embodiments of the present invention relate to information technology (IT) user support. Specifically, embodiments of the present invention relate to an approach for providing collaborative support to a user in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Sometimes, a user of a cloud computing system may experience difficulties during utilization of the cloud computing system. If such a user belongs to a support community, the user will often attempt to obtain help solving these difficulties from the support community. For example, the user may describe the problem(s) and/or issue(s) that they are experiencing on a particular networked resource with members of the support community (e.g., support staff and/or a larger audience). These support community members can use the description provided by the user to suggest solutions to the user's problem(s) and/or issue(s).

SUMMARY

In general, an approach for facilitating collaborative support to a user in a networked computing environment (e.g., a cloud computing environment) is provided. In an embodiment, specifications that describe a networked resource (e.g., a cloud resource) are retrieved. A set of preferences that specify a set of collaborators and a set of access limitations for the set of collaborators with respect to the networked resource are gathered in response to a request for help by a user. Also in response to the request, a clone of the networked resource is created. A collaborator from the set of collaborators is granted access to the clone of the networked resource having the set of access limitations. The collaborator can access the clone of the networked resource (e.g., to provide support to the user) until a terminating condition is met, at which time the collaborators' access to the clone is terminated.

A first aspect of the present invention provides a method for facilitating collaborative support to a user in a networked computing environment, the method comprising the computer-implemented processes of: retrieving specifications describing a networked resource; gathering, in response to a request for help by a user, a set of preferences, the set of preferences specifying a set of collaborators and a set of access limitations for the set of collaborators with respect to the networked resource; creating a clone of the networked resource in response to the request; granting an access to the clone of the networked resource having the set of access limitations to a collaborator of the set of collaborators; and in response to a terminating condition having been met, terminating the access of the collaborator to the clone.

A second aspect of the present invention provides a system for facilitating collaborative support to a user in a networked computing environment, comprising: a memory medium comprising instructions; a bus coupled to the memory medium; and a processor coupled to the bus that when executing the instructions causes the system to: retrieve specifications describing a networked resource; gather, in response to a request for help by a user, a set of preferences, the set of preferences specifying a set of collaborators and a set of access limitations for the set of collaborators with respect to the networked resource; create a clone of the networked resource in response to the request; grant an access to the clone of the networked resource having the set of access limitations to a collaborator of the set of collaborators; and in response to a terminating condition having been met, terminate the access of the collaborator to the clone.

A third aspect of the present invention provides a computer program product for facilitating collaborative support to a user in a cloud computing environment, the computer program product comprising a computer readable storage media, and program instructions stored on the computer readable storage media, that cause at least one computer device to: retrieve specifications describing a networked resource; gather, in response to a request for help by a user, a set of preferences, the set of preferences specifying a set of collaborators and a set of access limitations for the set of collaborators with respect to the networked resource; create a clone of the networked resource in response to the request; grant an access to the clone of the networked resource having the set of access limitations to a collaborator of the set of collaborators; and in response to a terminating condition having been met, terminate the access of the collaborator to the clone.

A fourth aspect of the present invention provides a method for deploying a system for facilitating collaborative support to a user in a networked computing environment, comprising: providing a computer infrastructure having at least one computer device that operates to: retrieve specifications describing a networked resource; gather, in response to a request for help by a user, a set of preferences, the set of preferences specifying a set of collaborators and a set of access limitations for the set of collaborators with respect to the networked resource; create a clone of the networked resource in response to the request; grant an access to the clone of the networked resource having the set of access limitations to a collaborator of the set of collaborators; and in response to a terminating condition having been met, terminate the access of the collaborator to the clone.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

The inventors of the invention described herein have discovered certain deficiencies in the current solutions for providing collaborative support to a user. For example, the current description-only solutions may make it difficult for collaborators to understand the problem that the user is attempting to describe. Further, the inability of these collaborators to access the cloud resource may make it difficult to do more than provide educated guesses as to the nature of the problem. However, allowing collaborators to access the actual cloud resource can pose security issues. Such access can lead to certain collaborators introducing unwanted changes to the cloud resource and/or the efforts of certain collaborators canceling out the efforts of others.

Embodiments of the present invention provide an approach for facilitating collaborative support to a user in a networked computing environment (e.g., a cloud computing environment). In an embodiment, specifications that describe a networked resource (e.g., a cloud resource) are retrieved. A set of preferences that specify a set of collaborators and a set of access limitations for the set of collaborators with respect to the networked resource are gathered in response to a request for help by a user. Also in response to the request, a clone of the networked resource is created. A collaborator from the set of collaborators is granted access to clone the networked resource having the set of access limitations. The collaborator can access the clone of the networked resource (e.g., to provide support to the user) until a terminating condition is met, at which time the collaborators' access to the clone is terminated.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
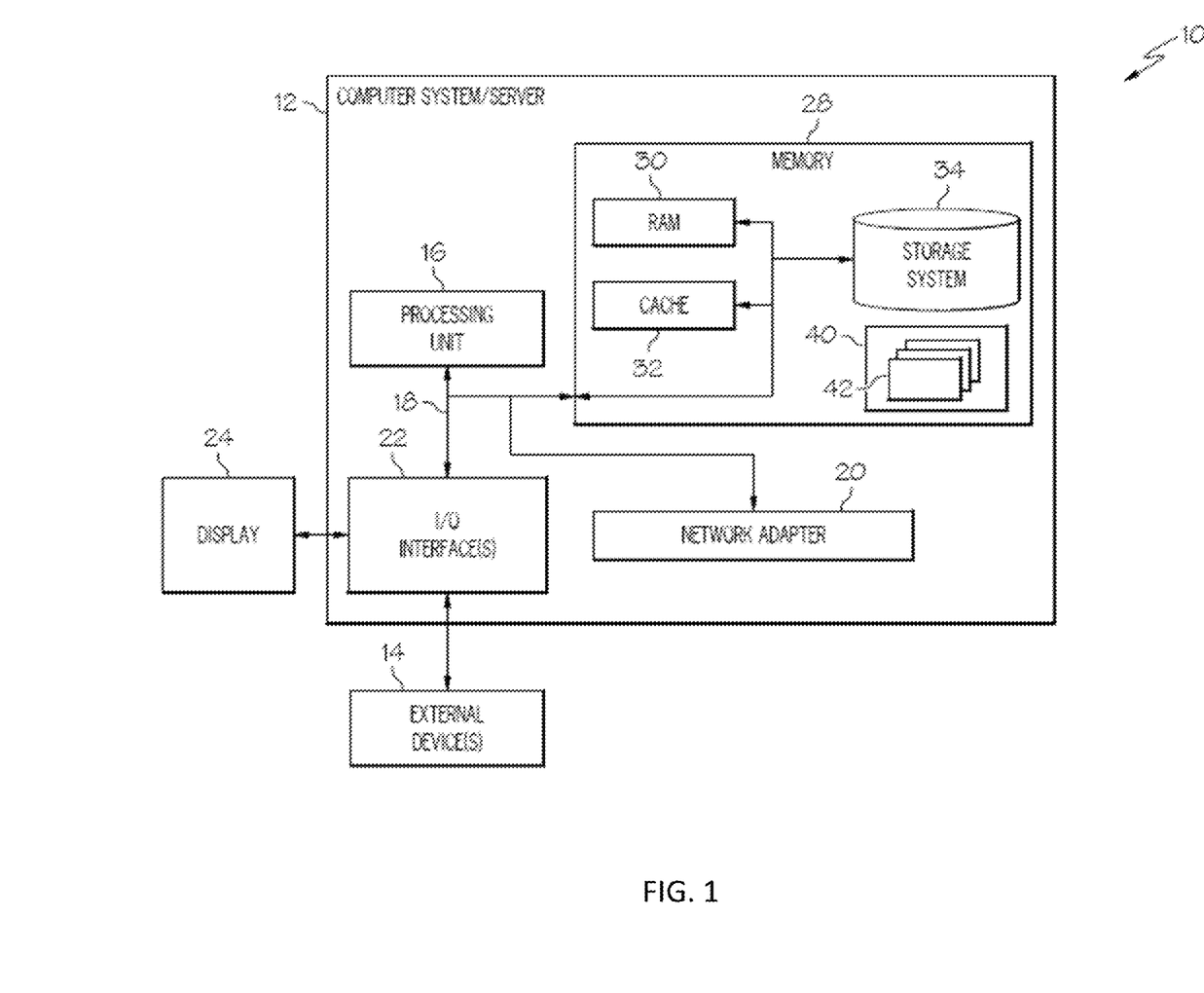
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
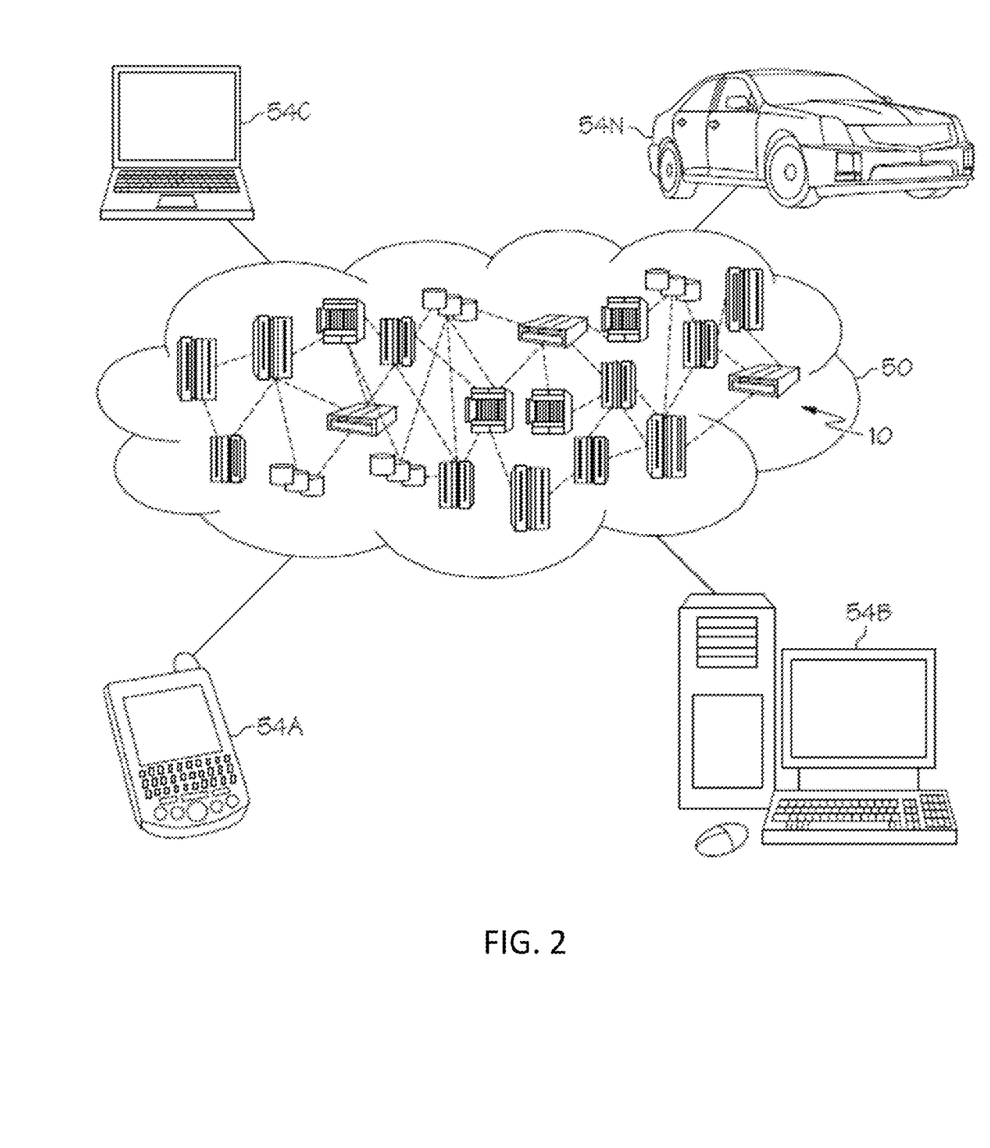
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
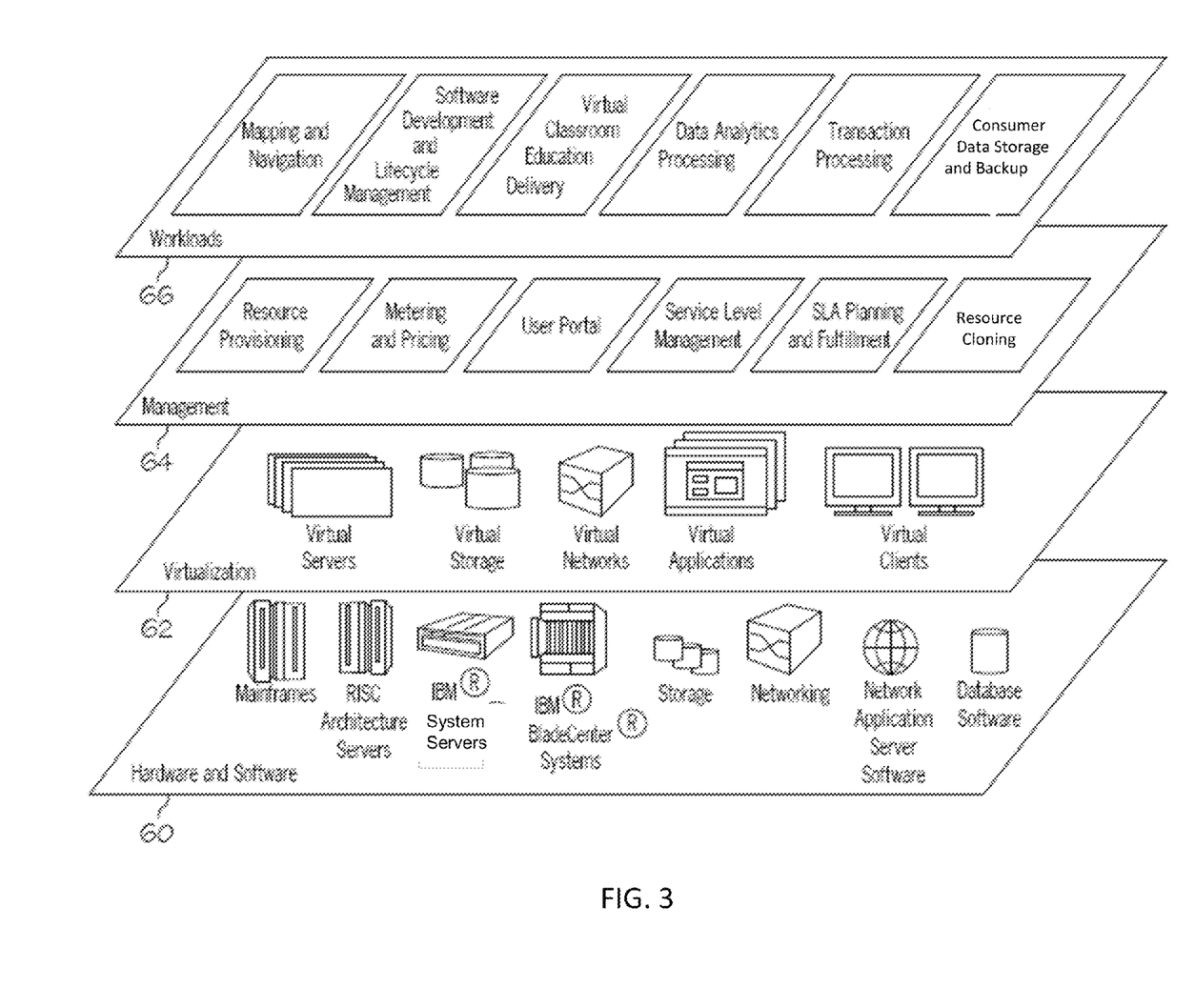
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is resource cloning, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
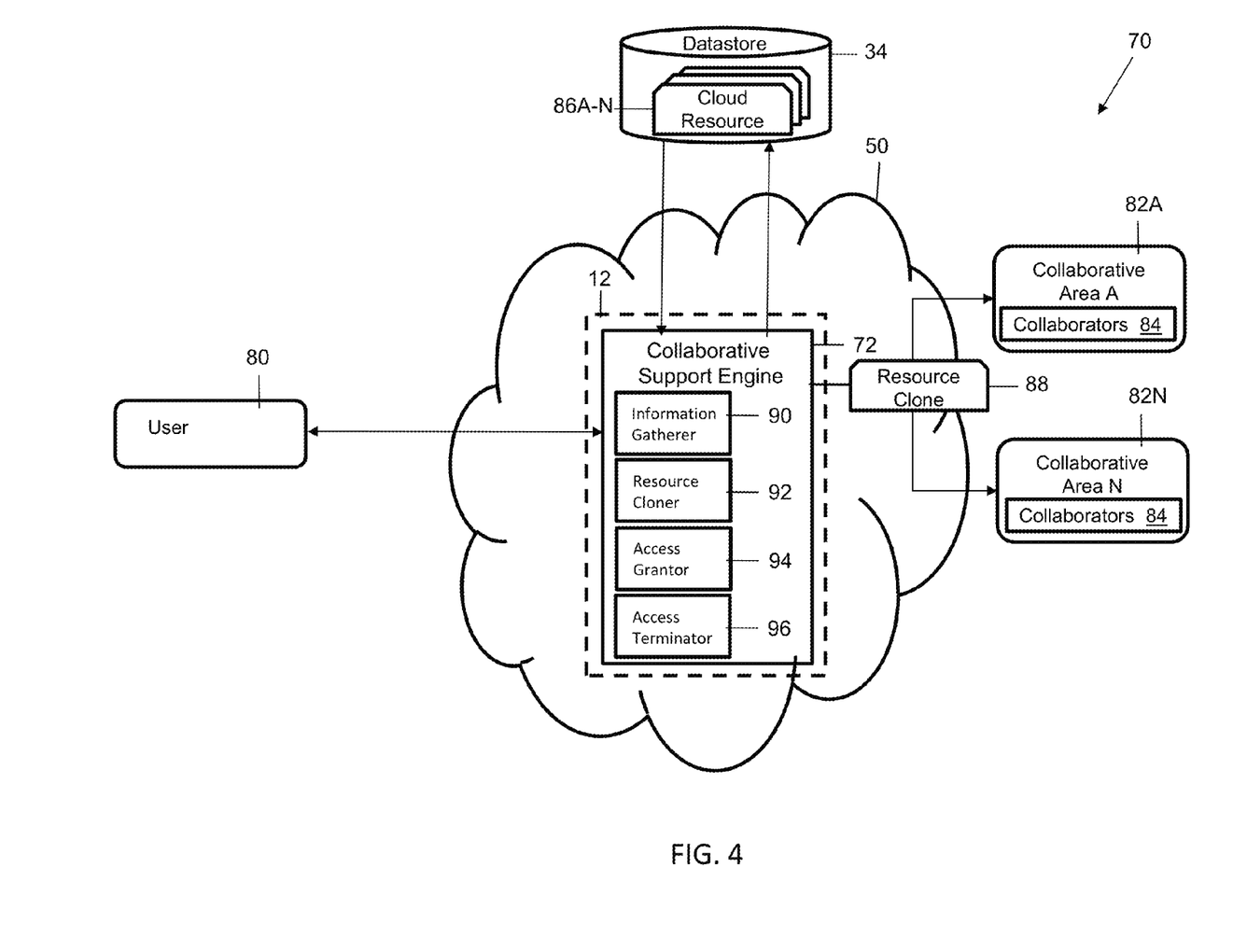
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each client need not have a collaborative support engine (hereinafter "system 72"). Rather, system 72 could be loaded on a server or server-capable device that communicates (e.g., wirelessly) with the clients to provide device protection therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can facilitate collaborative support for a user 80 in networked computing environment 70. To accomplish this, system 72 can include: an information gatherer 90, a resource cloner 92, an access grantor 94, and an access terminator 96.

Information gatherer 90 of system 72, as executed by computer system/server 12 is configured to retrieve specifications regarding a networked resource (e.g., cloud resource 86A-N). The cloud resource 86A-N for which the specifications are retrieved can be any resource or combination of resources in networked computing environment 70 to which user 80 may have access, including, but not limited to, one or more images, one or more image instances, storage, Internet protocol (IP) addresses, and/or the like. In an embodiment, cloud resource 86A-N includes at least one instance with which user 80 has an issue (e.g., a problem with the installation, configuration, execution, and/or the like).

In any event, the specifications that are retrieved by information gatherer 90 can include any information necessary for creating a resource clone 88 of a particular cloud resource 86A-N, as will be explained further herein. To this extent, the specifications can include, but not be limited to, an identifier for cloud resource 86A-N, a location of cloud resource 86A-N within datastore 34, a functional description of cloud resource 86A-N, a description of the issue or issues that user 80 is having with cloud resource 86A-N, and/or the like.

Information gatherer 90 can retrieve the specifications using any solution now known or later developed. For example, in an embodiment, user 80 can manually enter any or all of the specifications into an interface, such as a graphical user interface. Additionally, or in the alternative, information gatherer 90 can retrieve some or all of the specifications automatically. For example, information gatherer 90 can monitor communications of user 80 with collaborators 84 on one or more collaborative areas 82A-N for key words and/or phrases related to requests for help and can then parse the communications for information to be included in the specifications. To this extent, one or more of collaborative areas 82A-N can include a wiki, a team area, an email, a social networking site, a rational team concert, a support community, a blog, and/or the like.

In any event, information gatherer 90 can also gather a set of preferences. This set of preferences can be gathered in response to a request by the user 80 for help, e.g., with an issue the user 80 is having with cloud resource 86A-N. The set of preferences gathered by information gatherer 90 can specify a set of collaborators 84 that user wishes to share the cloud resource 86A-N, such as for the purpose of resolving the issue. To this extent, the set of preferences can include collaborators 84 based on any distinguishing factor or factors now known or later developed, including, but not limited to: membership of a collaborator 84 in a particular collaborative group, the role of the collaborator 84 within the collaborative group, the degree of separation of the collaborator 84 with respect to user 80 in a social network site, the physical location of the collaborator 84, the employer of the collaborator 84 and whether that employer is in common with that of the user 80, whether the collaborator 84 is employed within the same department as the user 80, whether the collaborator has previously interacted with the user 80 on collaborative area, and/or the like.

Further, the set of preferences gathered by information gatherer 90 can specify a set of access limitations for the set of collaborators with respect to the cloud resource. This set of access limitations can specify the conditions under which collaborators 84 can access a resource clone 88 of cloud resource 86A-N, which will be generated as described further herein. In an embodiment, the access limitations gathered by information gatherer 90 can set preferences regarding the time period during which the collaborator 84 will have access. This time period can include, but not be limited to, a length of time from the time user 80 allowed access, a length of time from the time the collaborator 84 first accessed resource clone 88, a total aggregate amount of time that the collaborator 84 accesses the resource, and/or the like. Additionally or in the alternative, the access limitations gathered by information gatherer 90 can set preferences regarding such factors as how many collaborators 84 can be accessing the resource clone 88 concurrently.

Figure 5:
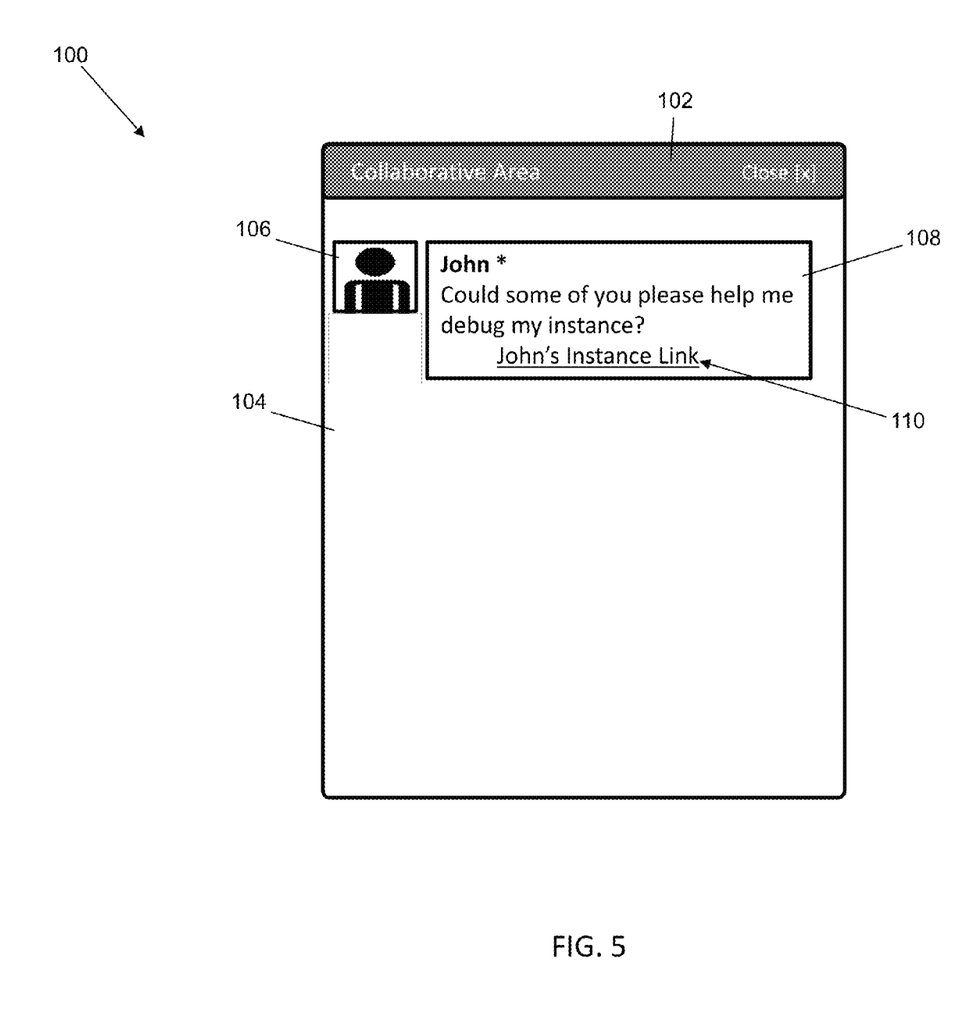
FIG. 5 depicts an example request for help according to an embodiment of the present invention.

Turning now to FIG. 5, an example request for help 100 is shown according to an embodiment. As shown, request for help 100 is communicated via a collaborative area 102. As shown, collaborative area 102 has a discussion space 104 into which a user 106 can post a topic for discussion 108. As shown, invitation is depicted as a post 108 by user 106 indicating a need for help in resolving an issue with an instance of a cloud resource 86A-N (FIG. 4). Also included is an access point 110 that a collaborator 84 (e.g., a member of collaborative area that is reading request for help 100) can follow to accept the user's 106 request for help.

Turning again to FIGS. 4 and 5 concurrently, resource cloner 92 of system 72, as executed by computer system/server 12 is configured to create a clone (e.g., resource clone 88) of the cloud resource 86A-N. Resource cloner 92 can create clone 88 to the request for help 100. For example, in the case of request for help 100 in FIG. 5, the act of creating the request for help 100 by the user 106 can cause resource cloner 92 to create the resource clone 88. In any case, resource cloner 92 can create resource clone 88 by taking one or more snapshots that reflect a current state of the cloud resource 86A-N at a particular point in time.

Access grantor 94 of system 72, as executed by computer system/server 12, is configured to grant an access to a collaborator from the set of collaborators. This access can be granted by access grantor 94 using any communication medium now known or later developed, including, but not limited to: a wiki, a team area, an email, a social networking site, a rational team concert, a support community, a blog, and/or the like. As such, access grantor 94 can grant access to multiple different collaborators 84 using the same communication medium. This can be done by creating an instance of the resource clone 88 for each collaborator 84 that is granted access to the resource clone 88. To this extent, each collaborator 84 that is granted access can have an identical version of the resource clone 88 that can be used by that particular collaborator 84 in isolation. In an embodiment, an access point that can be used to access the resource clone 88 can be provided. For example, in the case of FIG. 5, one or more collaborators 84 (e.g., a member of collaborative area 102 that can view the request for help 100) who interacts with access point 110 (e.g., by clicking on the link) can be granted access to resource clone 88 and an instance of the resource clone 88 can be created for each collaborator.

In any case, this access to resource clone 88 can be configured such the collaborator 84 can access resource clone 88 in the environment that is native to the collaborator 84 (e.g., on the client, server, network, etc., of the invitee). In the alternative, access to resource clone 88 can be provided in a temporary area to which the collaborator 84 has access. In this case, temporary login credentials may be assigned to any collaborators 84 for accessing the temporary area. Additionally, the collaborator 84 could be provided information, such as instructions for accessing the resource clone 88, a description and/or type of cloud resource 86A-N, the issue that needs to be resolved, access control policies, and/or the like.

Collaborator 84 accesses resource clone 88 in accordance with the set of access limitations that were previously gathered by information gatherer 90. To this extent, if the access limitations specify that only a fixed number (e.g., three) collaborators 84 are allowed access to resource clone 88 and this fixed number has already been met, access grantor 94 would not allow access to resource clone 88 by an additional collaborator 84, even if the collaborator 84 was specified in the set of preferences and/or interacted with the access point 110. Similarly, if someone outside of the set of specified collaborators 84 attempted to access the resource clone 88 (e.g., in the case that the request for help 100 was forwarded), access grantor 94 would allow resource clone 88 to be accessed. In addition, access conditions included in resource clone 88 can specify a terminating condition after which collaborator's 84 access to resource clone 88 will be terminated.

In any case, collaborators 84 who have been accepted by access grantor 94 can be provided full access to resource clone 88 subject to the access conditions. This full access can allow the collaborator 84 to execute, perform installations, change parameters, and/or perform any other action on the resource clone 88 that may be necessary to diagnose and/or resolve the user's 80 issue. Further, the use of multiple resource clones 88 can allow a plurality of collaborators 84 to pursue independent investigations into the nature of user's 80 issue without introducing changes that may conflict with the work being done by other collaborators 84. Additionally or in the alternative, a plurality of collaborators 84 can work together using a single resource clone 88. In addition, the fact that the access and any changes are being made on clones of the user's cloud resource 86A-N preserves the original cloud resource 86A-N of the user 80 and insulates it from unwanted access and/or changes.

Figure 6:
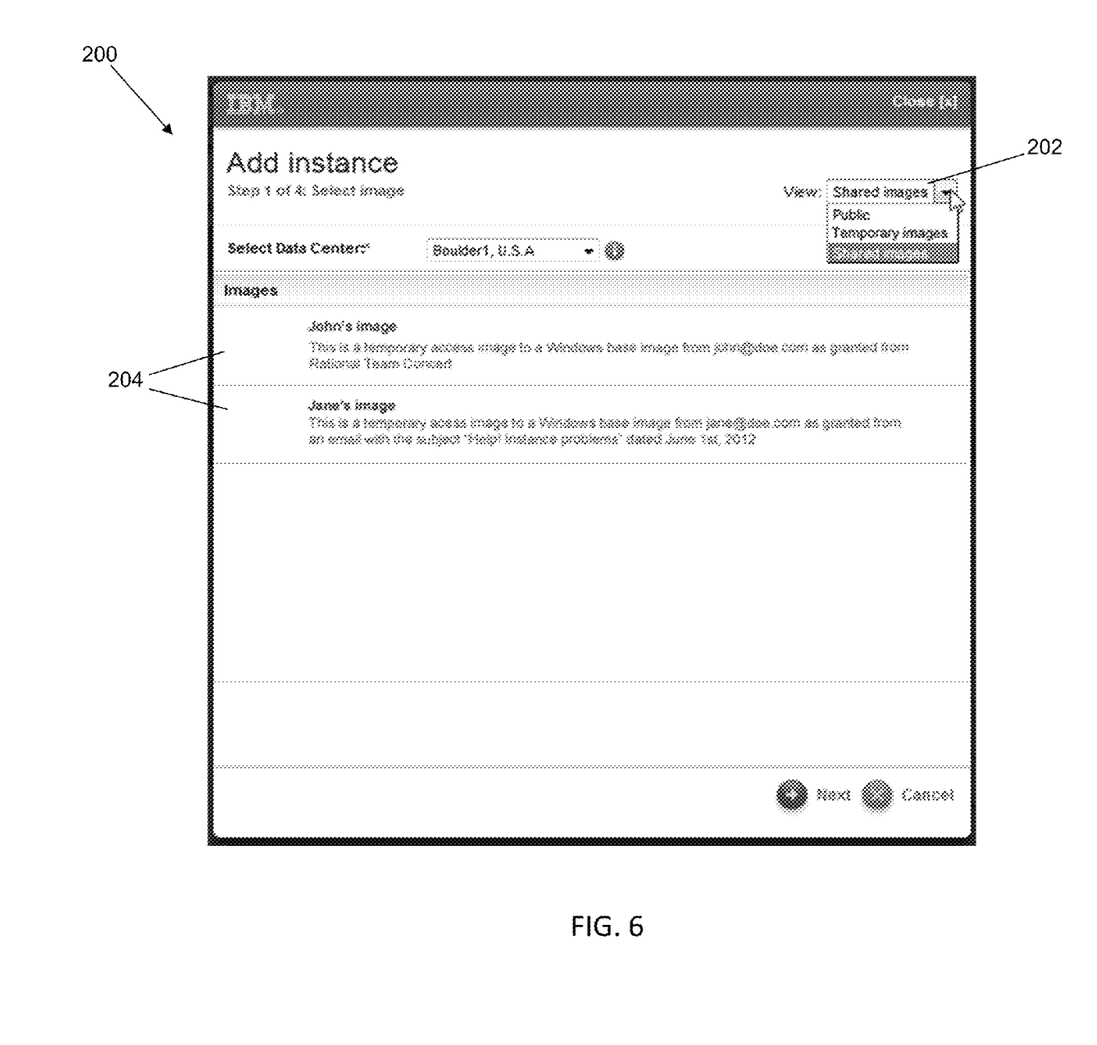
FIG. 6 depicts an example user interface according to an embodiment of the present invention.

Turning now to FIG. 6, an example user interface 200 according to embodiments of the invention is shown. As shown, user interface 200 can allow a collaborator 84 to view any resource clones 88 (FIG. 4) to which the collaborator 84 may have access. As shown, user interface 200 can include one or more selectors 202 that enable the collaborator 84 to select from different groups/categories of resource clones 88. It should be understood that the number and designation of groups/categories are for purposes of illustration only and should not be construed as limiting. In any case, also illustrated are a number of images 204. Each of images 204 represents a resource clone 88 (FIG. 4) to which the collaborator 84 has been granted access. To this extent, user interface 200 can provide a way for the collaborator 84 to access any of the images 204 for which invitations have been sent from a single interface.

Turning again to FIG. 4, access terminator 96 of system 72, as executed by computer system/server 12 is configured to terminate access of the collaborator 84 to the clone in response to a terminating condition having been met. The terminating condition can be specific to a single user, a group of users, or all users. This terminating condition can be time-based, such as the expiration of a predetermined usage time for the collaborator 84 or collaborators 84. In the alternative, the terminating condition could include an indication that an issue for which the user has requested help has been resolved and/or that the user no longer needs help. Such an indication could originate from the user or from one or more of the collaborators 84. In cases in which the terminating condition includes the indication that the issue has been resolved, resource clone(s) 88, corresponding to the collaborator 84 that resolved the issue, can be set aside for access by the user 80.

In any case, user 80 can access the resource clone(s) 88 and/or use the resource clone(s) 88 to resolve the issue. For example, user 80 can analyze the resource clone(s) 88 to determine what actions were taken to resolve the issue. Additionally, or in the alternative, user 80 can incorporate one or more of these actions into the original cloud resource 86A-N, such as by manually performing one or more of the actions performed by the collaborator 84 or replacing all or a part of the original cloud resource 86A-N with the resource clone 88 corresponding to the collaborator 84 that resolved the issue. All other copies of the resource clone 88 of the cloud resource 86A-N can be removed from the system. Further, access to any cloud resources 86A-N that were related to the resource clone 88 (e.g., cloud resources created based on the resource clone 88), such as by the collaborators 84 with access to the clone, can be terminated and/or the cloud resources 86A-N themselves can be removed. For example, if a collaborator 84 had saved some files for the cloned image 88 in shared storage, that storage could also be released when it was no longer needed.

Figure 7:
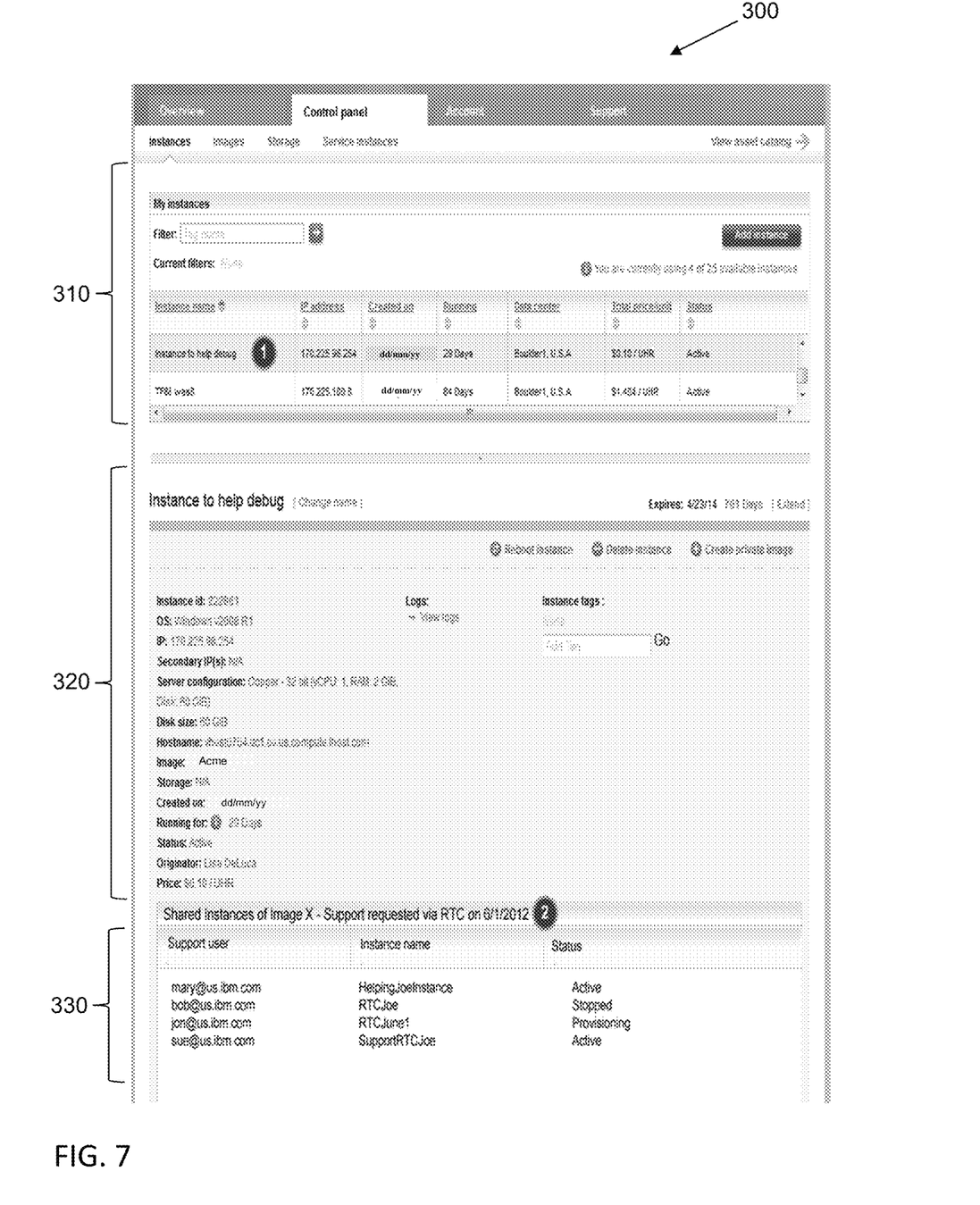
FIG. 7 depicts an example user interface according to an embodiment of the present invention.

Referring now to FIG. 7, an example user interface 300 according to embodiments of the invention is shown. As shown, in conjunction with FIG. 4, user interface 300 can allow a user 80 to view any resource clone(s) 88 to which the user may have provided access. To this extent, user interface 300 is illustrated having a listing 310 of cloud resources 86A-N associated with a particular user (in this case "Joe"). Listing 310 can include all cloud resources 86A-N associated with the user or, in the alternative, can include cloud resources 86A-N for which invitations have been sent and resource clones 88 have been forwarded. In the illustration, a cloud resource 86A-N for which a resource clone 88 has been forwarded is shown as being selected (as shown by the circled number 1). This selection has opened a description section 320 that shows details about the cloud resource 86A-N. In addition, because the cloud resource 86A-N is one for which a resource clone 88 has been forwarded, a shared instances section 330 has also been opened. As illustrated, shared instances section 330 shows that access has been granted to four resource clones 88, only two of which are currently active. User 80 could use the user interface 300 to terminate access of an collaborator 84 to the resource clone 88 (e.g., to Bob whose status is indicated as stopped). Additionally, or in the alternative, if Sue indicates that she has resolved the issue with cloud resource 86A-N, user 80 could highlight the instance representing the resource clone 88 associated with Sue and analyze the instance and/or choose a new option to replace his current cloud resource 86A-N instance with Sue's resource clone 88 instance.

Figure 8:
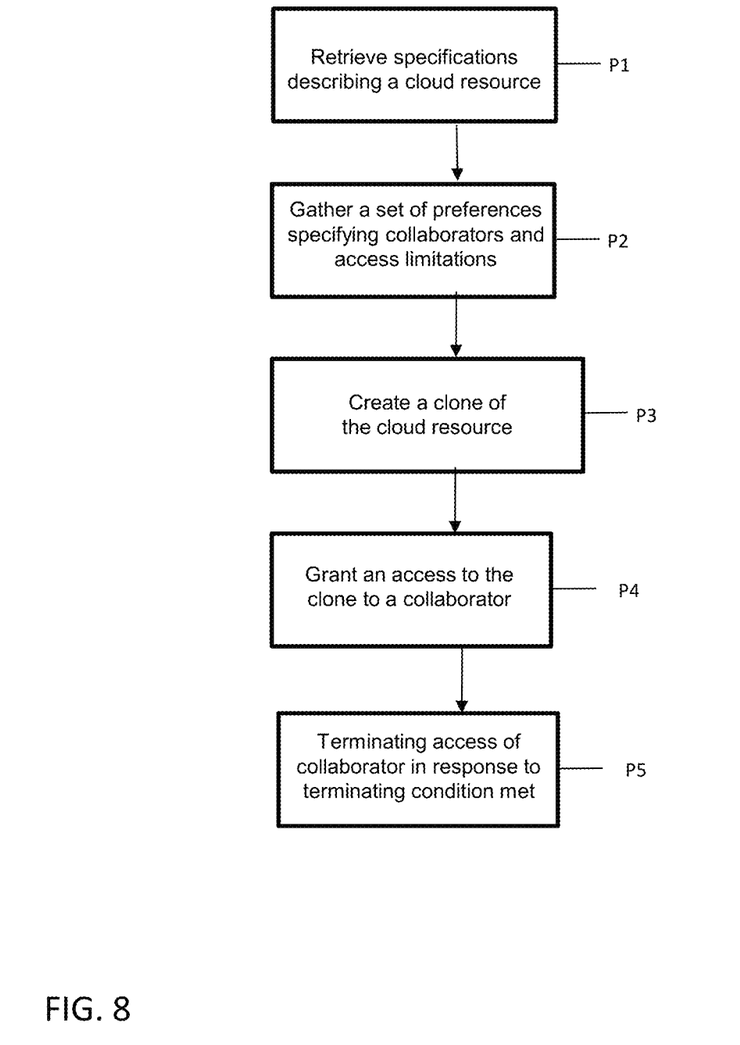
FIG. 8 depicts an example process flow according to an embodiment of the present invention.

Referring now to FIG. 8, a method flow according to an embodiment of the present invention is shown. At P1, information gatherer 90 of system 72, as executed by computer system/server 12, receives specifications describing a cloud resource 86A-N. At P2, information gatherer 90 of system 72, as executed by computer system/server 12, gathers a set of preferences specifying a set of collaborators 82A-N and a set of access limitations. At P3, resource cloner 92 of system 72, as executed by computer system/server 12, creates a clone (e.g., resource clone 88) of the cloud resource 86A-N. At P4, access grantor 94, grants an access to the clone 88 of the cloud resource that has the set of access limitations to one or more collaborators. At P5, access terminator 96 of system 72, as executed by computer system/server 12, terminates access of the collaborator 84 to the resource clone 88 in response to meeting of a terminating condition.

The flow of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for facilitating collaborative support to a user in a networked computing environment, it is understood that the invention further provides various alternative embodiments. For example, in one embodiment, the invention provides a computer-readable/useable medium that includes computer program code to enable a computer infrastructure to facilitate collaborative support to a user in a networked computing environment, as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide functionality for facilitating collaborative support to a user in a networked computing environment. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for facilitating collaborative support to a user in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for facilitating collaborative support to a user in a networked computing environment, the method comprising the computer-implemented processes of:
    retrieving specifications describing a networked resource;
    gathering, in response to a request for help by a user, a set of preferences, the set of preferences specifying a set of collaborators and a set of access limitations for the set of collaborators with respect to the networked resource;
    creating a clone of the networked resource in response to the request;
    granting an access to the clone of the networked resource having the set of access limitations to a collaborator of the set of collaborators;
    in response to a terminating condition having been met, terminating the access of the collaborator to the clone;
    generating an access point for accessing the clone of the networked resource;
    enabling the access by the collaborator to the clone and creating an instance of the clone of the networked resource particular to the collaborator in response to the collaborator activating the access point; and
    enabling an access by a second collaborator to the clone and creating a second instance of the clone of the networked resource particular to the second collaborator in response to the second collaborator activating the access point, wherein a communication medium via which the second collaborator activates the access point is identical to the communication medium via which the first user activates the access point.

2. The method of claim 1, wherein the communication medium is selected from a group consisting of: a wiki, a team area, an email, a social networking site, an instant messaging chat, a collaborative teaming environment, a support community or a blog.

3. The method of claim 1, wherein the set of access limitations include at least one access limitation that limits access to the clone of the networked resource based on at least one of: membership in a collaborative group, a role within the collaborative group, a degree of separation in relation to the user in a social network site, a physical location of the invitee, a common employer with the invitee, a common employment department with the invitee, or a previous interaction of the collaborator with the user over a social network site.

4. The method of claim 1, wherein the terminating condition includes at least one of: an expiration of a predetermined time period or an indication that an issue for which the user has requested help has been resolved.

5. The method of claim 4, further comprising in response to the terminating condition of an indication that the issue has been resolved having been met:

accessing a clone of the networked resource corresponding to the collaborator that resolved the issue;

using the clone of the networked resource corresponding to the collaborator that resolved the issue to resolve the issue on the networked resource;

removing all other copies of the clone of the networked resource; and removing all networked resources related to the clone.

6. The method of claim 1, wherein the networked computing environment is a cloud computing environment and wherein the network resource is a cloud resource.

7. A system for facilitating collaborative support to a user in a networked computing environment, comprising:

a memory medium comprising instructions;

a bus coupled to the memory medium; and a processor coupled to the bus that when executing the instructions causes the system to:

retrieve specifications describing a networked resource;

gather, in response to a request for help by a user, a set of preferences, the set of preferences specifying a set of collaborators and a set of access limitations for the set of collaborators with respect to the networked resource;

create a clone of the networked resource in response to the request;

grant an access to the clone of the networked resource having the set of access limitations to a collaborator of the set of collaborators;

in response to a terminating condition having been met, terminate the access of the collaborator to the clone;

generate an access point for accessing the clone of the networked resource;

enable the access by the collaborator to the clone and create an instance of the clone of the networked resource particular to the collaborator in response to the collaborator activating the access point; and enable an access by a second collaborator to the clone and create a second instance of the clone of the networked resource particular to the second collaborator in response to the second collaborator activating the access point, wherein a communication medium via which the second collaborator activates the access point is identical to the communication medium via which the first user activates the access point.

8. The system of claim 7, wherein the communication medium is selected from a group consisting of: a wiki, a team area, an email, a social networking site, an instant messaging chat, a collaborative teaming environment, a support community or a blog.

9. The system of claim 7, wherein the set of access limitations include at least one access limitation that limits access to the clone of the networked resource based on at least one of: membership in a collaborative group, a role within the collaborative group, a degree of separation in relation to the user in a social network site, a physical location of the invitee, a common employer with the invitee, a common employment department with the invitee, or a previous interaction of the collaborator with the user over a social network site.

10. The system of claim 7, wherein the terminating condition includes at least one of: an expiration of a predetermined time period or an indication from the user that an issue for which the user has requested help has been resolved.

11. The system of claim 10, the instructions, in response to the terminating condition of an indication that the issue has been resolved having been met, further causing the system to:

access a clone of the networked resource corresponding to the collaborator that resolved the issue;

use the clone of the networked resource corresponding to the collaborator that resolved the issue to resolve the issue on the networked resource;

remove all other copies of the clone of the networked resource; and remove all networked resources related to the clone.

12. The method of claim 7, wherein the networked computing environment is a cloud computing environment and wherein the network resource is a cloud resource.

13. A computer program product for facilitating collaborative support to a user in a cloud computing environment, the computer program product comprising a computer readable storage media, and program instructions stored on the computer readable storage media, that cause at least one computer device to:

retrieve specifications describing a networked resource;

gather, in response to a request for help by a user, a set of preferences, the set of preferences specifying a set of collaborators and a set of access limitations for the set of collaborators with respect to the networked resource;

create a clone of the networked resource in response to the request;

grant an access to the clone of the networked resource having the set of access limitations to a collaborator of the set of collaborators;

in response to a terminating condition having been met, terminate the access of the collaborator to the clone;

generate an access point for accessing the clone of the networked resource;

enable the access by the collaborator to the clone and create an instance of the clone of the networked resource particular to the collaborator in response to the collaborator activating the access point; and enable an access by a second collaborator to the clone and create a second instance of the clone of the networked resource particular to the second collaborator in response to the second collaborator activating the access point, wherein a communication medium via which the second collaborator activates the access point is identical to the communication medium via which the first user activates the access point.

14. The computer program product of claim 13, wherein the communication medium is selected from a group consisting of: a wiki, a team area, an email, a social networking site, an instant messaging chat, a collaborative teaming environment, a support community or a blog.

15. The computer program product of claim 13, wherein the set of access limitations include at least one access limitation that limits access to the clone of the networked resource based on at least one of: membership in a collaborative group, a role within the collaborative group, a degree of separation in relation to the user in a social network site, a physical location of the invitee, a common employer with the invitee, a common employment department with the invitee, or a previous interaction of the collaborator with the user over a social network site.

16. The computer program product of claim 13, wherein the terminating condition includes at least one of: an expiration of a predetermined time period or an indication from the user that an issue for which the user has requested help has been resolved.

17. The computer program product of claim 16, the instructions, in response to the terminating condition of an indication that the issue has been resolved having been met, further causing the at least one computer device to:

access a clone of the networked resource corresponding to the collaborator that resolved the issue;

use the clone of the networked resource corresponding to the collaborator that resolved the issue to resolve the issue on the networked resource;

remove all other copies of the clone of the networked resource; and remove all networked resources related to the clone.

* * * * *